United States Patent Office 3,473,416
Patented Oct. 21, 1969

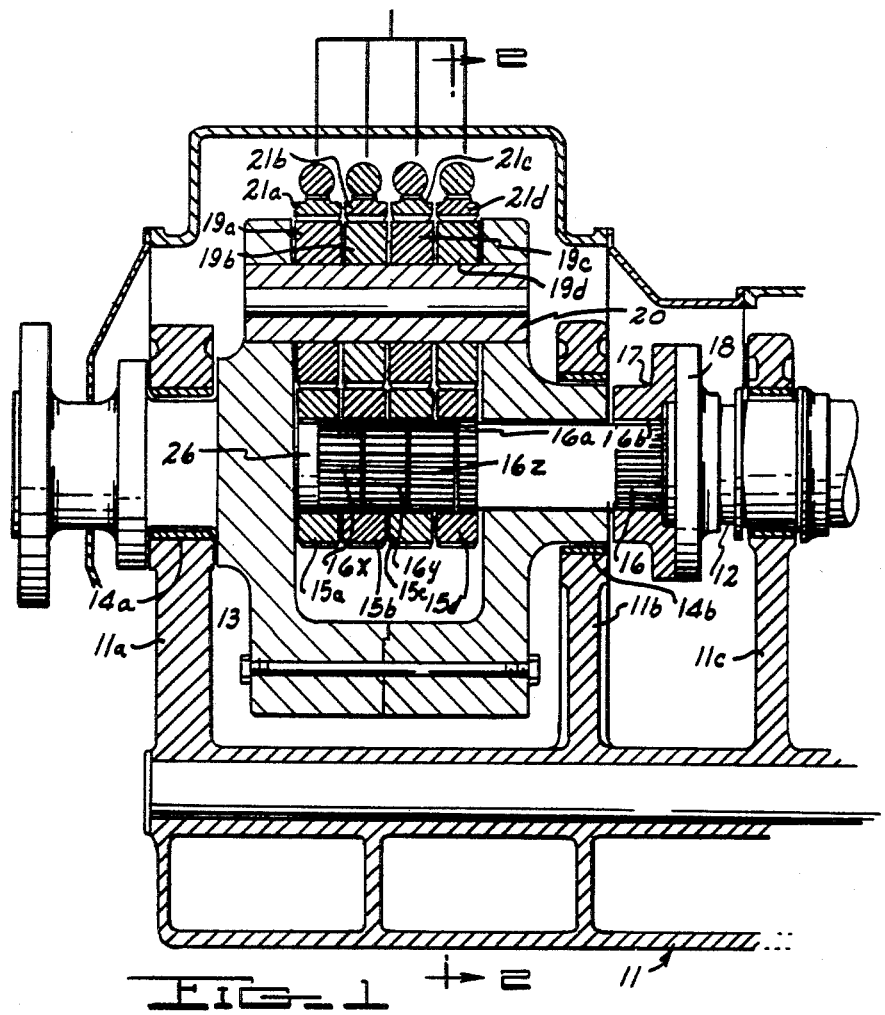

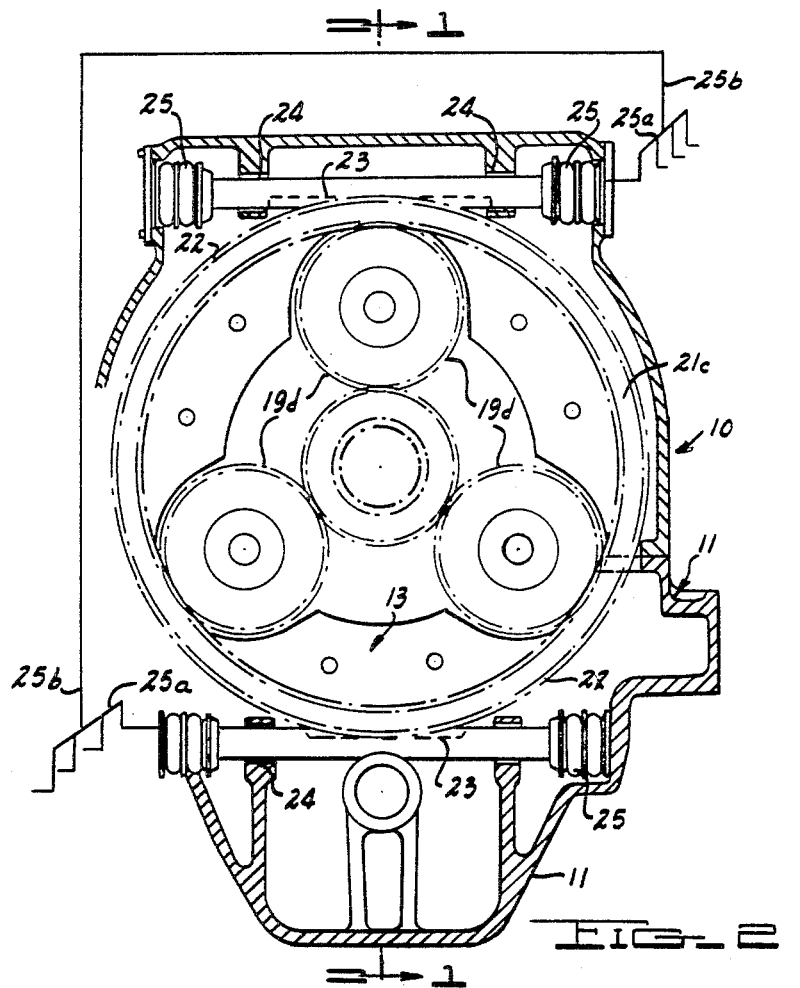
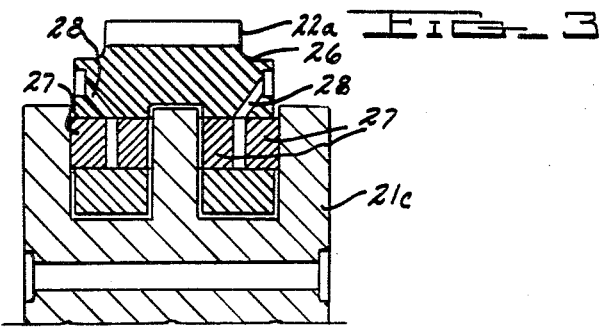

3,473,416
EPICYCLIC GEARING
Joseph A. Pope, 12 Carrwood Road, Bramhall, Cheshire, England, and William Lowe, 4 Grenville St., Dukinfield, Cheshire, England
Filed Apr. 20, 1966, Ser. No. 543,842
Claims priority, application Great Britain, Apr. 20, 1965, 16,440/65
Int. Cl. F16h 1/32, 1/34
U.S. Cl. 74—801                                      7 Claims

ABSTRACT OF THE DISCLOSURE

As indicated by the title, the epicyclic gearing of the instant invention is a gear train which has a load compensating device integral therewith that operates in both directions so as to eliminate the wear and noise normally encountered as a result of torsional deflection under load of the gear teeth which are engaged. This is accomplished by the provision of resiliently yieldable members which are cooperable with a plurality of substantially fixed gears, in which are located a plurality of planetary gears, each of which is in engagement with a pinion gear that is in turn in engagement with a bobbin that acts to couple the complete epicyclic gear train in such a manner as to effect a uniform load distribution.

---

The design of all gearing to transmit a given torque is based on tooth load, which is a function of the pitch circle diameter and the axial length of the teeth. In epicyclic gearing the selection of pitch circle diameter is often limited by overall size limitations whereas more freedom would be available for increasing the axial length of the teeth except for the problem of angular deflection along the axis of the sun pinion which deflection can upset the distribution of load along the teeth to such extent as to limit the maximum practical axial tooth length.

To meet the aforesaid deflection problem it is known to subdivide the annulus and/or sun member, and to connect the parts thereof as an assembly by mechanical means such as a sleeve so as to provide a degree of built-in angular flexibility while also providing separate planet pinions thereby providing a plurality of epicyclic gear trains in parallel load-bearing coupling. All such known constructions while they mitigate the deflection problem aforesaid within their limits have their own inherent problems, such as resonance, which can prove serious. Such arrangement permits any one epicyclic gear train to off-shed part of the load it would otherwise carry so that such part is carried by one or more of the other epicyclic gear trains but it does not balance the load distribution as between the several gear trains.

One object of the present invention is to provide an improved construction of epicyclic gearing of the kind having axial subdivision of the stationary gear members, yieldable torsional mountings for holding them stationary and complementary sets of planetary pinions, for effecting load distribution axially within the gear, and in which there is automatically provided load distribution balance as between the several epicyclic gear trains.

As regards load distribution, amongst the several planet pinions of an epicyclic gear train this is automatic to some extent within the freedom of floating movement deriving from manufacturing tolerances and to some extent by flexure of the annulus which can be augmented by design. In a long toothed gear, axial rigidity of the sun member also limits the degree of automatic load distribution thus obtainable.

The present invention is also based upon the appreciation of such limitation due to axial rigidity and has for a further object to provide built-in freedom at the sun member of each epicyclic train so as to modify such axial rigidity and thereby take further advantage of the known automatic action within the gear train itself for effecting load distribution as aforesaid.

According to a first feature of the present invention an epicyclic gear comprising a plurality of stationary gear members, complementary sets of planetary and third pinion members forming a plurality of epicyclic gear trains, in combination with resilient torsional mounting means for holding stationary each said stationary gear member for the purpose of providing load distribution axially through the gearing, is characterised by means inter-connecting the said resilient torsional mounting means of axially displaced stationary gear members in such manner as to effect balanced distribution of loading of such mountings.

The epicyclic gear aforesaid may be further characterised by a plurality of angularly symmetrically displaced resilient mountings for each stationary gear member to relieve the gear bearings of resultant forces, and by means inter-connecting such angularly displaced mountings in such manner as to effect substantially equal angular inter-distribution of loading of such mountings; and by rotatable mounting and hydraulic clutch means for the normal stationary gear members.

According to the invention an epicyclic gear of the kind comprising a plurality of annuli each with its own yieldable torsional mounting and set of planet pinions is characterised by a sun wheel assembly of individual sun pinions for each gear epicyclic train thus provided and means for transmitting torque to such sun pinions with permitted individual radial displacement for each.

The epicyclic gear aforesaid may be further characterised by torque transmitting means permitting relative angular flexibility of the axis of the sun wheel assembly.

In the accompanying drawings:

FIG. 1 is a longitudinal section of one example of an epicyclic gear made in accordance with the present invention, and also incorporating the invention of our co-pending application for Patent No. 16,440/65, taken on line 1—1 of FIG. 2.

FIG. 2 is a cross section on line 2—2 of FIG. 1.

FIG. 3 is a detail longitudinal section of a modification which is also shown in the drawings accompanying the provisional specification of our earlier application for patent aforesaid.

FIGS. 4 and 5 are diagrams to illustrate the built-in freedom provided in the construction shown in FIGS. 1 to 3.

Figure 6:
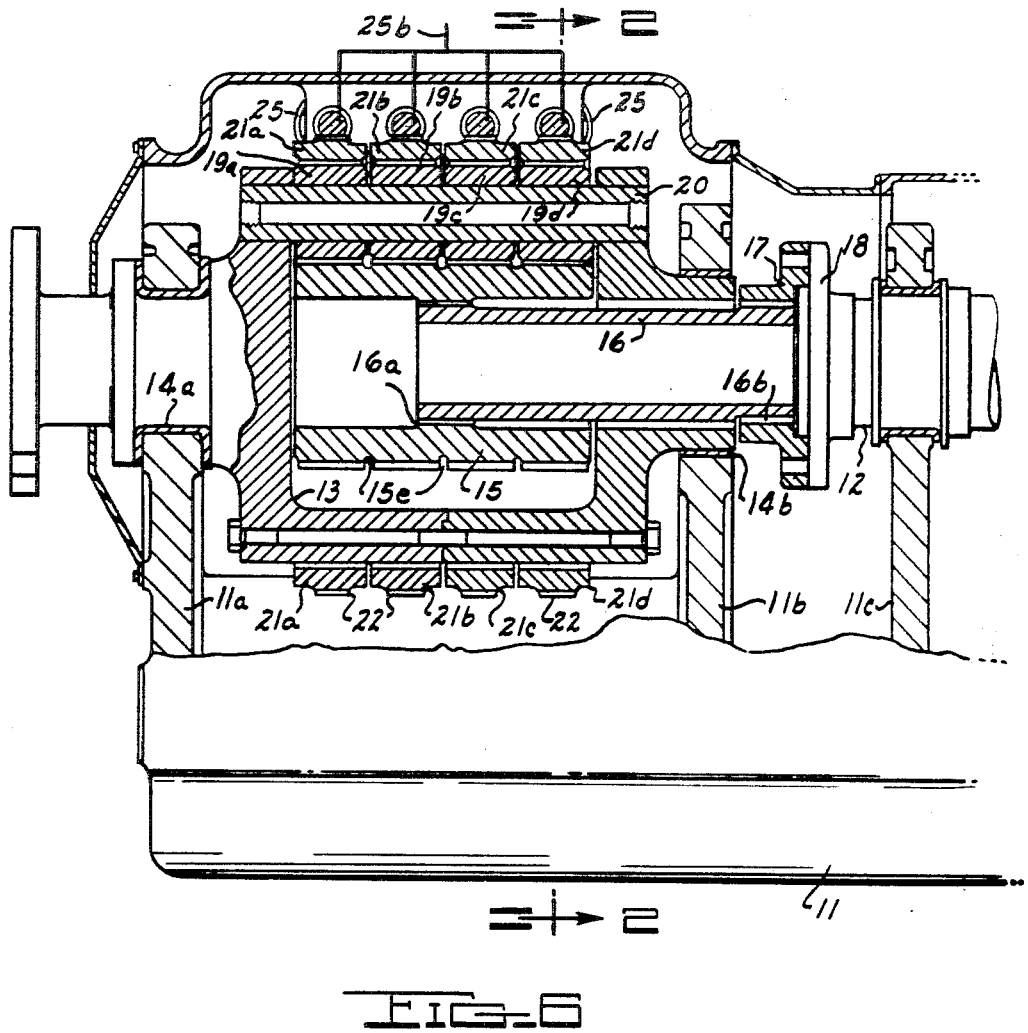
FIG. 6 is a longitudinal section showing an alternative construction of the gear shown in FIG. 1.

As shown in FIGS. 1 and 2 of the drawings, from the bed plate 11 are webs 11a and 11b which support the gearing, and a web 11c which supports the engine shaft 12. The gear embodies a planet carrier 13 and has a cover or box 10. In place of the usual common sun pinion for the four epicyclic gear trains there are four separate sun pinions respectively 15a, 15b, 15c and 15d, one for each epicyclic gear train. Each such pinion is splined internally and adjacent pinions are coupled together by floating bobbins 16x, 16y and 16z splined externally at their ends complementary to the internal splines of the pinions each bobbin having splined engagement in approximately half only of the two adjacent sun pinions. A filler piece 26 is provided, which may be peripherally splined or plain. The construction of the assembly for the control of axial movement will embody known principles of construction as regards working clearances. An input shaft 16, which may be tubular for lightness has at one end set of splines 16a complementary to the internal splines of the sun pinion 15d and another set of splines 16b complementary to a driving flange 17 forming one part of a drive coupling of which the other flange 18 is fixed to the end of the engine shaft 12.

The separate sun members and floating bobbins together form a floating sun assembly with the individual sun members in series torque coupling.

The planet pinions 19a, 19b, 19c and 19d respectively are provided in three banks as shown in FIG. 2 and the four planet pinions of each bank being journaled on a common shaft 20 carried by the planet carrier 13. Common to each such set of planet pinions is an annulus 21a, 21b, 21c and 21d respectively each provided with diametrically opposed toothed sections 22 complementary to toothed racks 23, slidably mounted in bearings 24 carried by the cover or box 10 and bed plate 11. At each end of the racks 23 are air bellows 25 to provide axial resilience for such racks and torsional resilience for the annulus. In a modification three such toothed racks may be provide at 120 degree relative angularity.

To provide load distribution at the annulus, these air bellows are shown diagrammatically interconnected in banks by pneumatic piping 25a and diagrammatically in complementary banks by pneumatic piping 25b.

In operation as shown in FIG. 1 driving torque from the engine shaft 12 reaches the sun pinion 15d direct from the splines 16a. The adjacent sun pinion 15c receives its torque indirectly, i.e., from the sun pinion 15d through the coupling bobbin 16z; and so on up to the last sun pinion 15a, indirectly through all three coupling bobbins 16x, 16y and 16z. However, since such coupling is by splines as distinct from meshing teeth of a gear train, it is no real problem to proportion the splines at 16a to transmit the whole torque whether or not it is distributed to the other sun pinions. In fact, on such strength factor alone, considerably more than four such sun pinions can be coupled in this manner. A major breakthrough in load distribution is provided by this construction since it provides a degree of freedom of radial movement at each sun pinion since the end of the shaft 16 and all the bobbins are floating, so that each of each epicyclic gear train may automatically assume a position of minimum individual load and thereby take advantage of automatic load distribution within each epicyclic gear train, hitherto limited not only by the relative rigidity of the shafts 20 carrying the planet pinions but also by the inherent rigidity of the common sun pinion.

As shown in FIG. 3, each annulus, such as 21c is formed with a pair of peripheral grooves in which is located a bifurcated annular ring 26 formed with teeth or sections of teeth 22a, similar to the teeth 22 of FIGS. 1 and 2, complementary to the racks 23, aforesaid. In each side of the bifurcated annular ring 26 are a plurality of pairs of clutch pistons 27 adapted to be hydraulically energised through ducts 28 to provide a friction clutch assembly.

As shown in the diagrammatic FIGS. 4 and 5 the lines 16a represents the axis of the input shaft while 16X, 16Y and 16Z represent the axes of the respective bobbins 16x, 16y and 16z.

These figures show that the several axes may be displaced radially or angularly, i.e., inclined to each other, or have any combination of such movements, as may be demanded by the parts of each epicyclic gear train for automatic load distribution. The displacement shown is of course exaggerated to make the point clear. The balancing of the load distribution, as distinct from off-shedding, is still provided by the interconnection of the resilient torsion mountings 25 of the several annuli 21a, 21b, 21c and 21d.

As shown in FIG. 6 the gear has most of the parts shown in FIG. 1 and these are given the same reference characters. The main constructional difference is that instead of the floating assembly of bobbins 16x, 16y and 16z and sun pinions 15a, 15b, 15c and 15d there is a single sun pinion 15 coupled by splines at its centre to the splined end 16a of the shaft 16. The outer periphery of this pinion 15 is divided by grooves 15e. Such construction while providing load distribution at the several annuli, as in FIG. 1 has the relative disadvantage of rigidity at the sun pinion compared with the floating assembly aforesaid of separate sun pinions for each annulus and coupling bobbins between them.

What we claim is:

1. An epicyclic gear train comprising a plurality of epicyclic gear trains in parallel load bearing coupling, having a pneumatic cushion rotation arresting means for the annulus of each such gear train and pneumatic interconnection of said cushion means for equalizing the pressure therein, said gear train having individual sun members and floating torque transmitting elements adjacent thereto in series torque coupling.

2. In an epicylic gear train, the combination of,
a first set of substantially stationary gear members having internal and external teeth;
a resiliently mounted rack in toothed engagement with the external teeth of said first set of gears, one rack for each of said gears;
a plurality of planet gears in toothed engagement with the internal teeth of each of said first gear members;
a plurality of sun pinions in toothed engagement with each of said planet gears;
a plurality of floating bobbins having gear teeth thereon, each bobbin having toothed engagement with approximately one half of each of the two adjacent sun pinions, thereby effecting a uniform load distribution throughout the entire gear train when said assembly is operated under load.

3. An epicyclic gear train according to claim 2 further characterised by fluid means inter-connecting the said resilient mounting members to equalise the pressures therein.

4. An epicyclic gear train according to claim 2 further characterised in that the said resilient torsional mounting members comprise pneumatic bellows and inter-connecting pressure-equalising piping.

5. An epicyclic gear train according to claim 2 further characterised by a plurality of resilient end mountings for each rack and associated gear symmetrically displaced to effect angular interdistribution of loading for the annuli.

6. An epicyclic gear train according to claim 2 further characterised by disengageable clutch means for each of the normally stationary gear members.

7. An epicyclic gear train comprising a plurality of epicyclic gear trains in parallel load-bearing coupling, having a pneumatic cushion rotation-arresting means for the annulus of each such gear train and pneumatic interconnection of said cushion means for equalising the pressures therein, an externally toothed ring rotatably mounted on each annulus and disengageable friction clutch means between each said ring and annulus.

References Cited

UNITED STATES PATENTS

| | | | |
|---|---|---|---|
| 904,314 | 11/1908 | Davis | 74—33 |
| 2,353,814 | 6/1944 | De Pew | 73—136 |
| 2,464,494 | 3/1949 | Ferriera | 74—786 |
| 2,825,247 | 3/1958 | Haworth et al. | 74—801 |
| 2,868,037 | 1/1959 | Hindmarch | 74—801 X |
| 2,868,040 | 1/1959 | Chamberlin | 74—801 |
| 3,090,258 | 5/1963 | Zink et al. | 74—801 |
| 3,213,713 | 10/1965 | Sagara | 74—801 |

FOREIGN PATENTS

| | | |
|---|---|---|
| 124,980 | 9/1947 | Australia. |
| 773,458 | 4/1957 | Great Britain. |

DONLEY J. STOCKING, Primary Examiner

T. C. PERRY, Assistant Examiner

U.S. Cl. X.R.

74—410